Dec. 20, 1955      G. W. HAYCOCK      2,727,642
MACHINES FOR UNPACKING ARTICLES FROM CONTAINERS
Filed Dec. 28, 1951      5 Sheets-Sheet 1

Inventor
George Wallace Haycock
By
Richardson, David and Nordman   his Attorneys.

Dec. 20, 1955    G. W. HAYCOCK    2,727,642
MACHINES FOR UNPACKING ARTICLES FROM CONTAINERS
Filed Dec. 28, 1951    5 Sheets-Sheet 3
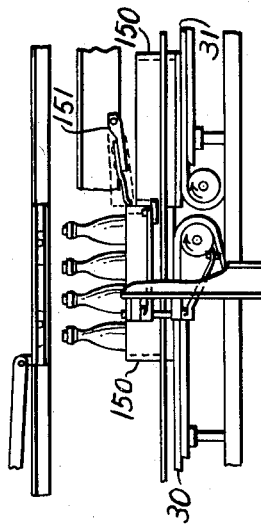
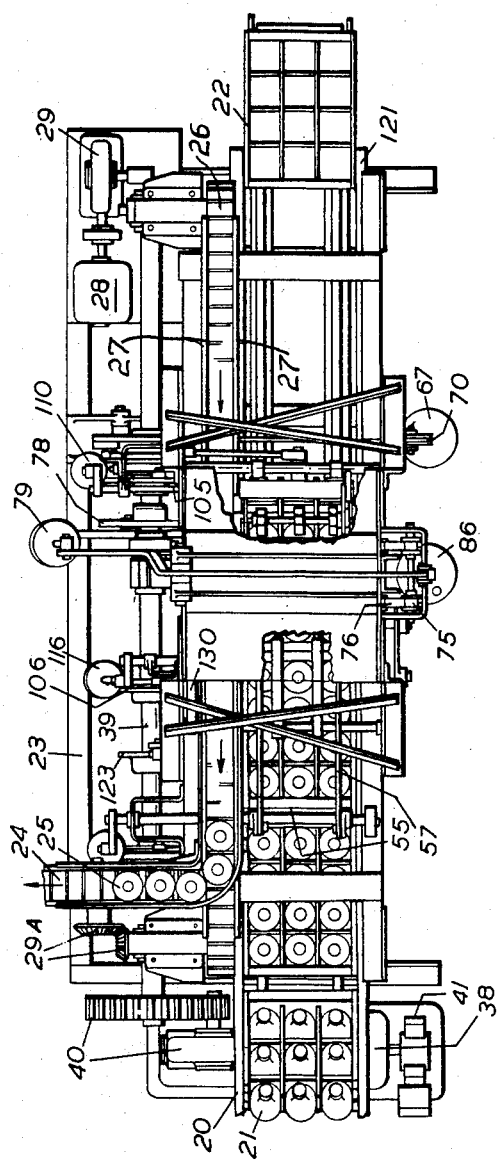
Inventor
George Wallace Haycock
By
Richardson, David and Jordan
his Attorneys

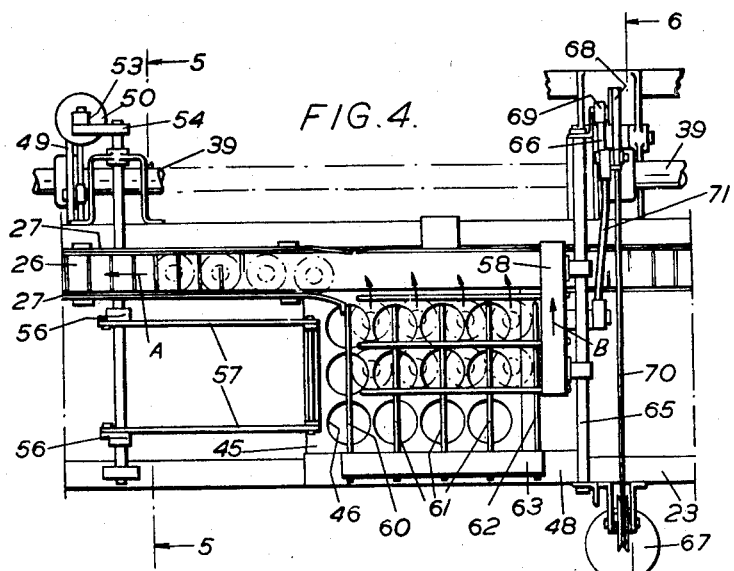
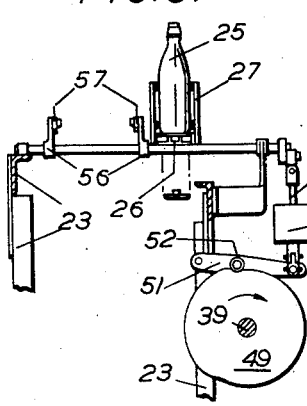
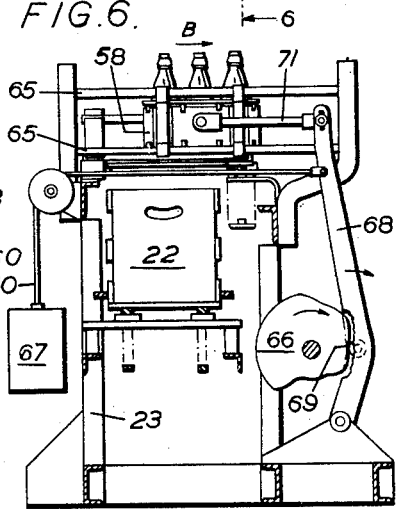
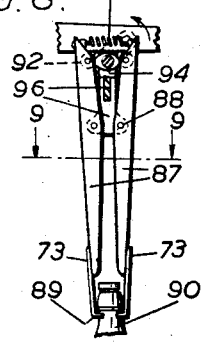
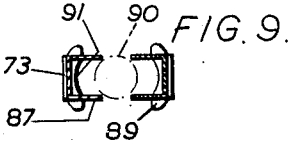

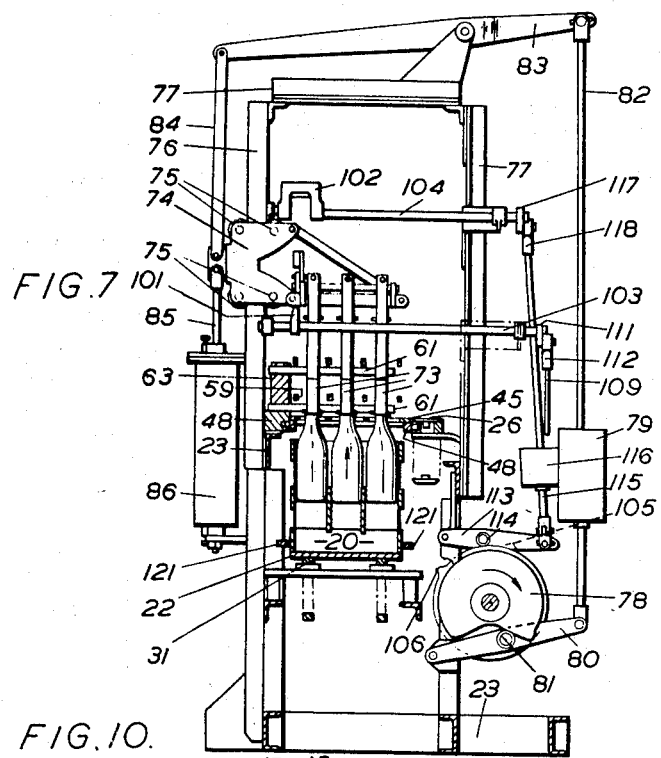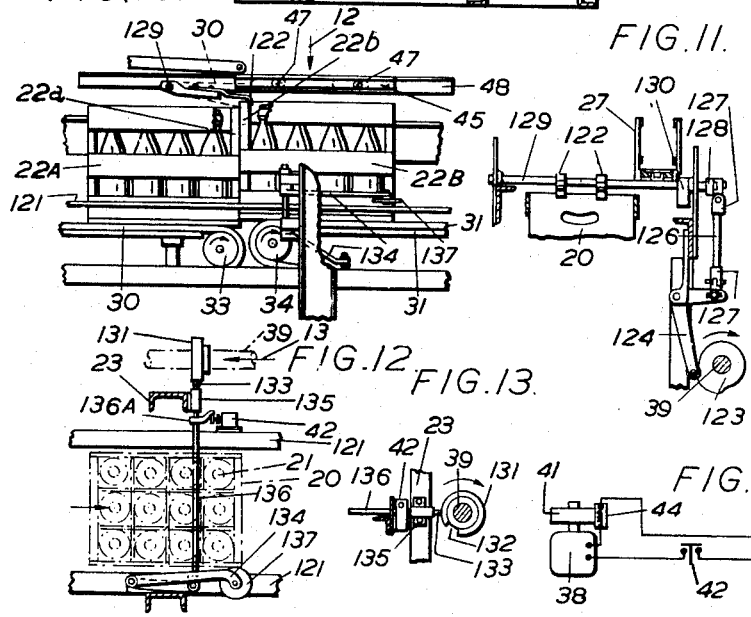

United States Patent Office 2,727,642
Patented Dec. 20, 1955

2,727,642

MACHINES FOR UNPACKING ARTICLES FROM CONTAINERS

George Wallace Haycock, Glasgow, Scotland, assignor to Haybar Limited, Glasgow, Scotland Application December 28, 1951, Serial No. 263,775

Claims priority, application Great Britain January 1, 1951

10 Claims. (Cl. 214—309)

This invention relates to unpacking machines, that is to say machines for unpacking bottles, jars and like articles from cases, boxes, cartons and like containers.

According to the invention, an unpacking machine comprises a container conveyor for conveying filled containers to and empty containers from an unpacking zone, an article conveyor for conveying unpacked articles in succession away from the unpacking zone, means for locating the containers one at a time in the unpacking zone, article-unpacking mechanism operating in the unpacking zone for removing the articles from the containers located thereat, and means for receiving articles unpacked by the unpacking mechanism and for transferring them to the article conveyor.

Further, according to the invention, the article-unpacking mechanism in an unpacking machine comprises article-grippers raisable from a lower position, in which they seize individually the articles of a group in a container, to an upper position in which the grippers put the articles into and release the articles within an article-receiver.

The means for receiving and transferring the unpacked articles may include a projectible article-support upon which the group of articles are depositioned by the article-grippers when raised and opened and are thereacross transferred by the article-receiver to the article-conveyor, and which is retractible into a position opening the way for the articles to be passed through the support into the article-receiver.

The article-support may be a plate, or tray, formed with a group of openings, one for each article, and movable between a supporting position, in which the articles rest upon portions of the plate adjacent to the openings, and a retracted position in which the openings register with the articles in a container located below so that the articles can pass through them.

The means for receiving and transferring the unpacked articles may also include an article-receiver under the control of mechanism for displacing it initially to its position in the unpacking zone to receive the articles removed by the unpacking mechanism, and thereafter a number of times to transfer the articles step by step to the article conveyor.

The machine also includes means associated with the container conveyor for aligning the containers and guiding them to the unpacking zone in combination with means for engaging each successive container temporarily to hold it correctly located in said zone during the unpacking operation.

The container conveyor may be stepped to facilitate correct engagement of the containers in succession by the engaging means.

Means also may be provided in association with the container conveyor for stopping the operation of the article-unpacking mechanism and article-receiving and transferring means in the contingency that there should not be a container correctly located in the unpacking zone, and the arrangement may be such that the subsequent locating of a container correctly in said position either re-starts the article-unpacking mechanism and article-receiving and transferring means automatically or sets the starting gear of said mechanism and means for hand-starting.

The invention will now be described, by way of example, as embodied in a machine for unpacking bottles from cases which are divided into compartments.

In the drawings:

Fig. 1 is an elevation of the machine as viewed from one side thereof and Fig. 2 is an elevation as viewed from the opposite side. Fig. 3 is a plan, portions being broken away to reveal working parts at a lower level. Fig. 4 is a fragmentary plan of the machine, being drawn to a larger scale than Fig. 3. Fig. 5 is a transverse view of a component of the machine and its operating mechanism, the view being a section approximately on the line 5—5 of Fig. 4. Fig. 6 is a transverse view of the machine, being a section approximately on the line 6—6 of Fig. 4. Fig. 7 is a transverse view of the machine, being a section approximately on the line 7—7 of Fig. 1. Fig. 8 is a detail view of a bottle gripper as already shown in Fig. 1, Fig. 8 being to a larger scale. Fig. 9 is an enlarged sectional view on the line 9—9 of Fig. 8. Fig. 10 is an elevation illustrating the passage of bottle-receiving cases on conveyors leading to and through the position in which bottles are received by the cases, the view showing parts as already shown in Fig. 1 but in greater detail. Fig. 11 is a section approximately on the line 11—11 of Fig. 2. Fig. 12 is a plan of a safety device co-operating with the cases, the view being in the direction of the arrow 12 in Fig. 10. Fig. 13 is a detail view in the direction of the arrow 13 in Fig. 12.

Fig. 14 is an electrical diagram illustrating the circuit of the machine which drives the main cam shaft of the machine.

Fig. 15 is a view corresponding to Fig. 10 but showing a modification.

Figure 1:
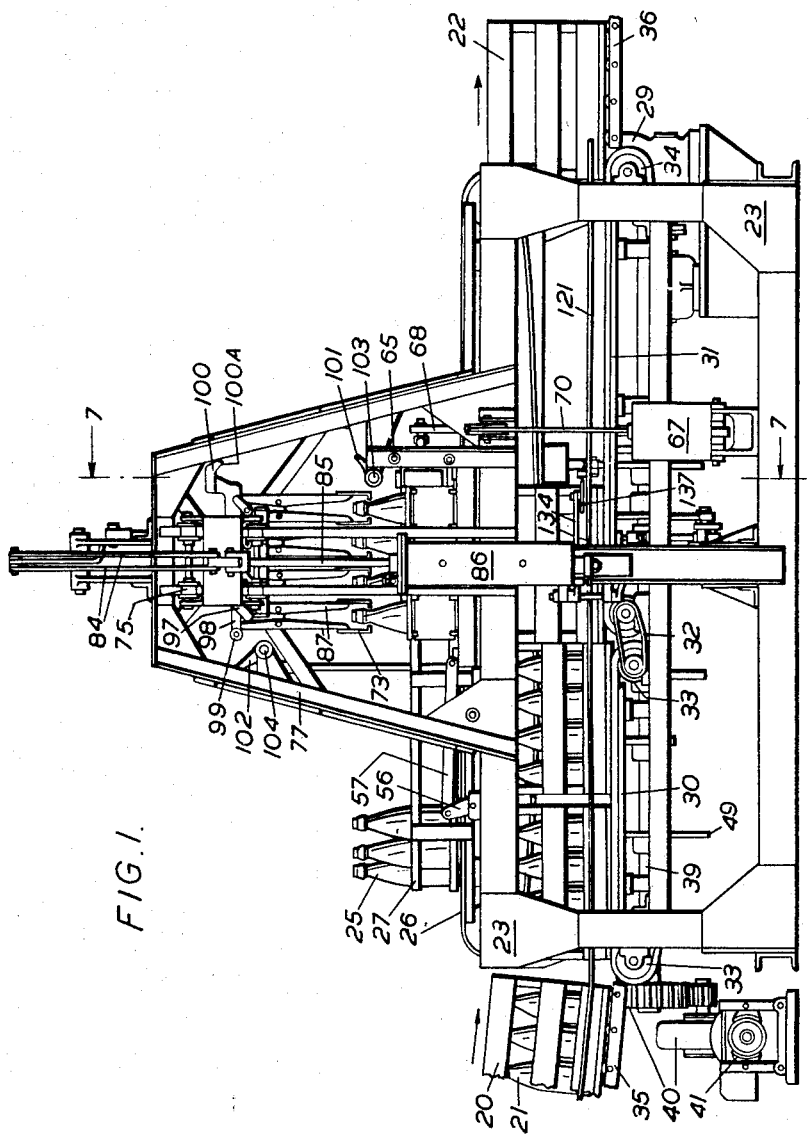

The machine according to the example is designed for unpacking bottles from cases supplied to it which each contain a dozen bottles assembled in three longitudinal rows containing four bottles each and also four transverse rows containing three bottles each. The arrangement will be clear from Figs. 1, 2 and 3, in which there are shown two incoming cases 20 each filled with a dozen bottles 21. The outgoing empty cases are indicated by 22. It will be seen that each case is divided by criss-cross partitions into compartments for the rows of bottles.

The general frame of the machine is indicated by 23. This frame has associated with it an externally driven transverse conveyor 24 (Fig. 3) by which bottles 25 are delivered from the machine, this conveyor being of any appropriate bottle-handling class and not being a component of the unpacking machine according to the present invention. The machine includes an upper-level bottle conveyor 26, which is of any appropriate class usual in machines for working on bottles and which is shown as consisting of an endless series of slats, the upper working run of which is between guide rails 27 that curve outwards from the bottle conveyor 26 to the transverse conveyor 24. The bottles, as they move along with the bottle conveyor 26, form themselves between the rails 27 in a single-file procession, standing with their bottoms slidably resting on the conveyor slats. These slats travel at a speed such that the conveyor 26 is capable of delivering bottles at a greater rate than the rate at which the machine can unpack bottles, the bottle conveyor 26 being continuously driven by the transverse conveyor 24 through bevel gears 29A.

The case conveyor for the incoming filled cases and outgoing empty cases comprises two endless lower-level travellers 30, 31 conveniently (but not necessarily) interconnected to work in tandem. In the example, the travellers 30, 31 are inter-connected by a chain drive 32, conventionally shown, between them. Each endless traveller consists of a pair of side-by-side endless belts or chains which are trained around terminal pulleys 33, 34 and on which the bottoms of the cases 20, 22 slidably sit. The incoming traveller 30 is arranged at a slightly lower level than the outgoing traveller 31 (see Fig. 1). Roller conveyors 35 and 36 lead to and from the travellers 30 and 31, respectively. The case conveyor 30, 31 is driven by an electric motor 28 through worm reduction gearing in a casing 29, the drive to the case conveyor and a cross-shaft 37 from the worm-wheel of the gearing in the casing 29.

Both the bottle conveyor 26 and the case conveyor 30, 31 extend longitudinally of the machine, the bottle conveyor being arranged above but offset transversely to one side of the case conveyor, as Fig. 3 shows.

The mechanisms, apart from the conveyors 26 and 30, 31, of which the machine is composed are operated by a separate electric motor 38 which can be stopped and re-started without affecting the continuous running of the conveyors. The said mechanisms are operated from a main cam shaft 39 which is driven by the motor 38 through gears 40. The motor drive is provided with an electro-magnetic brake 41 which comes into operation instantaneously to prevent over-running whenever the motor 38 is cut-out. The electric circuit of the motor 38 is shown in the diagram according to Fig. 14. This circuit incorporates a switch 42 in addition to the coil 44 of the brake 41.

The machine includes a projectible and retractible bottle support 45 (see Fig. 4) at the same upper level as the bottle conveyor 26. The support is a plate formed with a dozen holes 46 which are somewhat larger than the bottles and which are arranged and spaced in rows similarly to an assembled group of bottles. The plate 45 has side rollers 47 (Fig. 10) which run along tracks formed for them in side members 48 incorporated in the machine frame 23, so that the bottle-supporting surface of the plate 45 comes substantially flush with the supply conveyor 26. The slideway is arranged in the place herein called the "unpacking-zone." That is to say, the slideway is directly above that portion of the case conveyor traveller 31 where each successive case 20 is located temporarily (see Fig. 7) for withdrawal of its dozen bottles. The bottle support is movable, to an extent equal to only half the pitch of two adjacent transverse rows of three bottle holes, by means of a link-and-lever mechanism, which is operated by a cam 49 on the main cam shaft 39 against the return action of a counterweight 50. The mechanism comprises, as Figs. 4 and 5 show: a lever 51 with a cam-following roller 52; a rod 53 linking the lever 51 to a crank arm 54 on a cross-shaft 55 journalled on the frame 27, the weight 50 being carried by the rod 53; crank arms 56 linked by push-pull rods 57 to the bottle support 45.

The machine also includes a bottle-receiver which comprises a displaceable carrier 58 (Fig. 4) with a set of longitudinal fingers 59 and which, in the example, co-operates with a stationary set of transverse bottle-guiding spacers 60, 61, 62.

Each of the stationary transverse spacers 60, 61 or 62 consists of a pair of members (see also Fig. 7) arranged one above the other and spaced apart. The spacers extend towards the bottle conveyor 26 from a fixed support 63 on the frame and are arranged in the unpacking zone above the bottle-support 45. There are five of these spacers, three intermediate spacers 61 are arranged to come between four transverse rows of three bottles, and the two outer spacers 60, 62 form the longitudinal limits for each group of bottles. Thus, the five spacers form four transverse "gangways" for the bottles, each gangway having accommodation for three bottles. The proximal limit spacer 60 is joined to the adjacent guide rail 27 of the supply conveyor 26 so as, in effect, to serve as a right-angled continuation of said rail.

The set of longitudinal fingers 59 of the displaceable bottle-receiver extend in pairs in the same direction as the bottle-conveyance direction A, Fig. 4, from the carrier 58, which is arranged on a transverse slideway formed by guide rails 65 (Fig. 6) incorporated in the machine frame 23. The two fingers 59 forming each pair are vertically spaced apart. There are four pairs of these fingers 59, and they define three receiving spaces, each of which can accommodate four bottles in rows parallel to the bottle conveyor 26. The carrier is operated through a link-and-lever mechanism, hereinafter described, by a cam 66 on the main cam shaft 39 acting against a returning counterweight 67, the arrangement being such that, in the cycle of operations, the carrier 58 adopts four successive positions and, between them, receives three transverse steps from the cam 66 (Figs. 4 and 6) in the direction, see arrow B, towards the bottle conveyor 26, and thereafter a return movement from the weight 67. After the first, second and third steps of the carrier, the first, second and third receiving spaces, respectively, are temporarily aligned in succession with the bottle conveyor 26 so that each space transfers thereto a row of four bottles in single file. Fig. 4 shows the bottle-receiver at the end of the first of these steps. After the third step, the carrier is returned to and dwells in the initial position, where all three receivers are in the previously mentioned unpacking zone, in which they cross the transverse spacers 60—62 and co-operate with them to form a dozen bottle compartments and thus simulate the partitioned case 22 from which the bottles are to be unpacked.

The mechanism operated by the cam 66 and counterweight 67 comprises: a lever 68 with a cam-following roller 69; a flexible connection 70 from the weight 67 to the lever 68; a push-pull link 71 coupling the lever 68 to the carrier 58.

The machine also includes bottle-unpacking mechanism which works vertically up and down in the unpacking zone and which comprises a group of twelve bottle-neck grippers 73 suspended from a cross-head 74 (Figs. 7 and 8) forming the uppermost component in the unpacking zone. The cross-head 74 is movable up-and-down on rollers 75 along vertical guides 76 incorporated in a superstructure 77 on the machine frame 23 (Figs. 1 and 7) under the control of a single-acting cam 78 on the main cam shaft 49, to which cam the cross-head is applied through link-and-lever mechanism, hereinafter described. In the example, the cross-head is loaded by its own weight and the weight of a group of a dozen empty bottles when such are gripped by the grippers 73. The load may be lightened by fitting a weight 79, as shown in Figs. 2, 3 and 7, to the link-and-lever mechanism in the event that the combined weights of the cross-head and bottles are undesirably great.

The mechanism operated under the control of the cam 78 comprises, as Fig. 7 shows: a lever 80 with a cam-following roller 81; a rod 82 linking the lever 80 to an over-head lever 83 and carrying the weight 79; links 84 coupling the lever 83 to the cross-head 74. The arrangement is such that in a normal cycle of operations, the cross-head 74 moves downwards against the controlling influence of the cam 78 and is immediately thereafter positively forced to return upwards by the cam.

The cross-head 74 also is linked by a rod 85 to a pneumatic dash-pot 86 serving to oppose yieldingly, and thus cushion the descent and to some extent the ascent of the cross-head 74.

Each gripper 73 (Fig. 8) comprises a pair of blades extending from approximately vertical dependent legs 87, each fulcrumed at 88 to the cross-head framework 96. Each gripper blade 73 has an inturned toe 89, the two toes of the pair serving to grip resiliently a bottle neck 90 and being, for this purpose, formed with concave portions 91, Fig. 9, adapted partially to embrace said bottle neck. The two legs, near their top ends, carry rollers 92 which, under the pull of a spring 93 interconnecting the top ends, bear at opposite sides of an oval cam 94 for opening and closing the gripper 73. Each gripper forms one of a row of three grippers, the three cams 94 for which are all formed on one of four similar parallel cam shafts 95 (Fig. 7), which are journalled in the framework 96 of the cross-head. The four cam shafts, respectively, have crank arms 97 (Figs. 1 and 7) which are coupled by a longitudinally displaceable horizontal connecting rod 98, with a roller 99 at one end and a hook-like projection 100 at the other end. The arrangement is such that, when the connecting rod 98 is displaced by force applied to the hook-like projection 100, the four cam shafts 95 turn in unison through a right angle to force the grippers 73 to close; whereas, when the rod 98 is returned by force applied to the roller 99, the cam shafts 95 turn back and the grippers are pulled open by their springs 93.

The lowermost position of the cross-head 74 is such that the grippers 73 are disposed at the appropriate bottle-gripping level in relation to bottles in a case located in the unpacking zone, the arrangement being such that as the open grippers fall they freely pass the topmost portions of the bottle necks.

Figure 2:
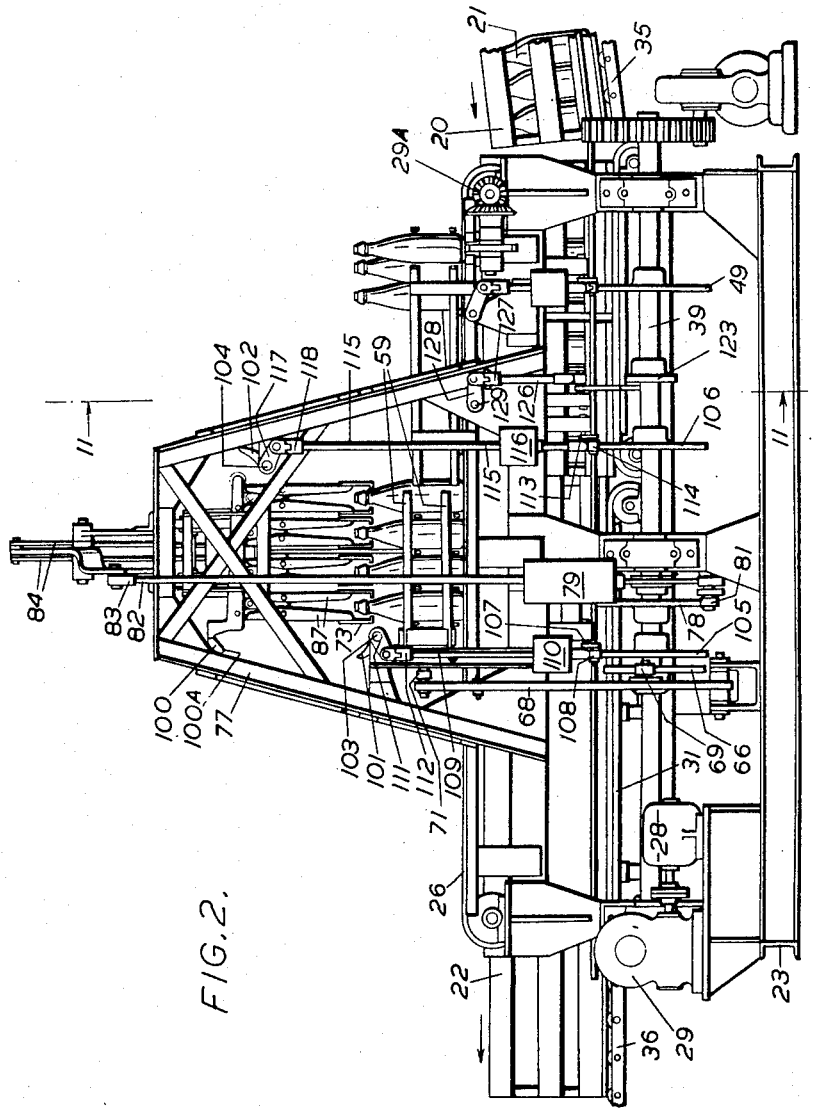

The normally uppermost position of the cross-head 74 is such that, as Figs. 1 and 2 show, the grippers 73 are disposed at the appropriate bottle-releasing level in relation to bottles on the bottle support 45 in the unpacking zone, the arrangement being such that when the bottles are being transferred by the bottle-receiver 58 along the four gangways to the supply conveyor 26, from the unpacking zone, their necks pass freely between the opened inturned toes 89.

The gripper-operating movements of the connecting rod are imparted to it by two strikers, namely a gripper-closing striker 101 and a gripper-opening crank-like striker 102. These strikers are arranged in the machine frame at opposite sides of the cross-head's vertical path and at positions approximately corresponding to the lowermost and uppermost levels of its range of down-and-up movement. Each of these strikers is an arm secured to a rock-shaft 103 or 104 and arranged under the control of one of two gripper-operating cams 105 and 106 on the main cam shaft 39, which cams act through link-and-lever mechanisms on the respective rock-shafts 103 and 104.

The mechanism operated by the cam 105 comprises, as Fig. 7 shows: a lever 107 with a cam-following roller 108; a rod 109 carrying a counter-weight 110 and linking the lever 107 to an arm 111 on the rock-shaft 103; universal joints 112 between the rod 109 and the parts 107 and 111 linked by it.

The mechanism operated by the cam 106 comprises: a lever 113 (see Fig. 2) with a cam-following roller 114; a rod 115 carrying a counter-weight 116 and linking the lever 113 to an arm 117 (see Fig. 7) on the rock-shaft 104; universal joints 118 between the rod 109 and the parts 113 and 117 linked by it.

The machine also includes means for locating the incoming filled cases 20 one at a time in the unpacking zone. In the example, the means provided comprise two contrivances. The first of these comprises fixed guide rails 121 ensuring that each case shall follow a substantially central longitudinal path through the unpacking zone. The second of these contrivances is to ensure that each case is stopped at the correct location in said path. This contrivance is a two-part pivotal catch 122 (Figs. 10 and 11) operated through a link-and-lever mechanism (hereinafter described) by a cam 123 on the main cam shaft 39. In the example, the catch is arranged to drop and engage the rear wall of each case 20 to be located. It is in order to facilitate and render surer the work of the catch 122, namely to engage the rear wall only, that the delivery conveyor is provided as two endless travellers 30, 31 at different levels, so that there is a step up from one to the other at the place where the leading wall of each case enters the unpacking zone, as Fig. 10 shows. The step is arranged so that the front wall of each case in succession can pass clearly beneath the catch 122 when the latter is in its dropped position and thereafter acts to uptilt the case as it moves into said zone, after which the case levels itself again as it is about to be correctly located in said zone. Fig. 10 shows one case 22A at the lower level position, in advancing from which its leading wall 22a will pass beneath the catch 122, and a case 22B in the unpacking zone ready to receive a group of bottles, its rear wall 22b being held by the catch.

The mechanism operated by the cam 123, as Fig. 11 shows, comprises the following: a bellcrank lever 124 with a cam-following roller 125; a rod 126 linking the lever 124 through a universal joint 127 to an arm 128 on a cross-shaft 129 to which the two-part catch 122 is secured; a counter-weight 130 (see Figs. 3, 10 and 11) in the form of an overhanging weighted lever fixed to the cross-shaft 129 and holding the roller 125 in contact with the cam 123.

In order to ensure that a case will be located in the unpacking zone at the time in the cycle of operations when the cross-head 74 is lowered, a safety device is provided. This device comprises two components which, under abnormal conditions, inter-act to stop the main cam shaft. One of these components is driven by the main cam shaft 39, being a stop-wheel 131 thereon (see Figs. 12 and 13) with a notch 132 in its rim. The other component is a tongue 133 attached by a rod 136 to a two-armed stop lever 134. The tongue 133 is movable in a guide 135 so arranged on the frame 23 that the tongue co-operates with the rim of the stop-wheel and can enter the notch. The lever is spring loaded by means of the previously mentioned electric switch 42. This is a spring-actuated self-opening switch which presses against an arm 136A on the rod 136. The lever 134 carries a roller 137 which is contactible by the side of each filled case 20 entering the unpacking zone. The action of such a case on the roller 137 is to hold the lever 134 from the rim of the wheel 131 so that the tongue 133 cannot enter the notch 132 under the action of the spring. If however no case is in the unpacking zone when the cross-head 74 is about to descend, the tongue 133 will enter the notch 132 under the spring action, so that the stop lever 134 will turn under the opening action of the switch 42, which is connected with the circuit of the cam shaft motor 38 (see Fig. 14), thus stopping the motor. The arrangement is such that when a case enters the proper location, the lever 134 is again actuated and allows self-closure of the switch 42, thus either causing the motor 38 to re-start automatically or setting it for hand-starting.

A cycle of operations of the machine according to the example will now be described.

Cases 20 of bottles 21 to be unpacked are fed to the case conveyor by the conveyor 35 (Figs. 1 and 2). These cases are advanced in succession by the case conveyor traveller 30 at a low level to the unpacking zone of the machine, where they are in turn located by engagement by the two-part pivotal catch 122 (Fig. 10).

When each case 20 is thus located with its rows of bottles parallel to the bottle conveyor 26, the bottle support 45 is in its retracted position (Fig. 7), the bottle-grippers 73 are open, and the bottle-receiver 58 is in position at the upper level in the unpacking zone. The crosshead 74 thereupon descends and the bottle-grippers are operated to grip the bottles 21 in the case 20, whereupon the cross-head rises to withdraw the bottles into the bottle receiver. The bottles are raised and momentarily held suspended slightly above the bottle-support 45, which is then projected (Fig. 4), after which the bottle-grippers 73 are opened to deposit the bottles thereupon. Next the bottle-receiver 58 is moved step by step at the upper level towards and across the bottle-conveyor 26 whereby the bottles are moved along the transverse "gangways" and the three rows of four bottles arranged parallel to said conveyor are each transferred in turn to said conveyor 26 fo delivery of the bottles in single file from the machine.

The bottle-receiver 58, after evacuation of the bottles therefrom, is returned still at its upper level to the unpacking zone and the bottle-support 45 is retracted in readiness for the next cycle of operations.

After removal of the bottles from each case, as aforedescribed the empty case is released by the pivotal catch 122 and then travels along with the case conveyor traveller 31 away from the unpacking zone to the conveyor 36. The catch 122 then engages the next following case prior to commencement of the next unpacking operations.

In the event that a case of bottles should not be correctly located at the unpacking zone in readiness for the unpacking operation the safety device 131—133 associated with the supply conveyor traveller 30 will stop the main cam shaft 39, as hereinbefore described.

Any of various modifications may be made.

In the example described, the cases are located by the cam-operated catches 122 which are arranged and timed to grip the top of the rear wall 22b of each case 22B (Fig. 10). Instead, there may be provided cam-operated catches to engage the leading edge of each case, for instance the top of each case. Fig. 15 shows such an instance, in which the cases 150 are what are known as half-cases, i.e. shallow cases from which the upper halves (or thereabouts) of the bottles project. As shown, instead of the high level catch 122 there is provided a two-part catch 151 at an intermediate level. This catch is cam-operated in the same way as already shown and described in relation to the catch 122. The catch 151 is arranged to engage in front of the top leading edge of each incoming half-case 150, filled with bottles to be unpacked. In this instance, the case conveyor components, namely the supply traveller 30 and the delivery traveller 31, are so arranged that there is a downward step between them.

The incoming half-cases on the supply traveller 30 are engaged in succession by the catch 151 and stopped in the unpacking zone. There the bottles are removed in the way already described with reference to Figs. 1 to 14. Then the catch 151 is raised by its cam action, so that the now empty case is conveyed forwards, tipping downwards clear of the catch as the case steps down from the unpacking zone upon the delivery traveller 31.

It will be obvious that it is merely by way of illustration that the machine according to the example has been described for unpacking cases which receive one dozen bottles grouped in three and four rows of four and three bottles respectively. The machine can be readily designed to unpack cases (or other containers) which receive any ordinary number or arrangement of bottles (or other articles).

I claim:

1. An unpacking machine comprising an unpacking zone which extends vertically from a position at a lower level to a receiving position directly above at an upper level, a container conveyor at said lower level for conveying filled containers to and empty containers from the unpacking zone, said containers having criss-cross partitions by which the articles are arranged in rows, an article conveyor at said upper level for conveying unpacked articles in succession away from the unpacking zone, means for locating the containers one at a time in said lower-level position in the unpacking zone with the rows of articles parallel to the article conveyor, article-unpacking mechanism operating vertically up and down in the unpacking zone for removing the articles from a container located in said lower-level position, means in said upper-level receiving position for supporting there the articles removed by the unpacking mechanism, co-operating devices extending above said supporting means and engaging the articles thereon to maintain them as a group in rows still parallel to the article conveyor, and means actuating one of said devices to move the group of articles at the upper level step-by-step transversely to the article conveyor and, at each step, to place one of said rows of articles in single file on the article conveyor, said actuating means acting also to return said one of the devices at the upper level from the article conveyor to the receiving position.

2. An unpacking machine according to claim 1 in which one of said co-operating devices consists of a transversely displaceable carrier with longitudinally projecting members spaced apart to define receivers for rows of articles, said members separating the supported group of articles into longitudinal rows.

3. An unpacking machine according to claim 2 including also article-guiding spacers extending transversely and being spaced apart, said spacers separating the articles further into transverse rows and being positionally related to said carrier and cooperating with said longitudinally projecting members to define therewith article-receiving compartments serving to maintain the initial positional relationship between all the articles of the group.

4. An unpacking machine according to claim 1 in which one of said co-operating devices consists of a stationary set of transversely projecting members spaced apart to provide gangways for the articles.

5. An unpacking machine comprising a container conveyor for conveying article-filled containers to, and removing emptied containers from an unpacking zone, article-unpacking mechanism operating in the unpacking zone for unpacking from successive containers there groups of the articles, an article-receiver for the articles in successive groups at the unpacking zone, an article conveyor for conveying the articles in succession from the article receiver, an article-transferrer included in the article-receiver to transfer each successive group of articles therefrom to the article conveyor, mechanism for displacing the article-transferrer in one direction into the unpacking zone for the reception there of the unpacked articles and for returning the article-transferrer in the opposite direction step-by-step a number of times to transfer the articles in the same number of successive rows to the article conveyor, separate power drives to said container conveyor on the one hand and to said article-unpacking mechanism on the other hand, a controller for maintaining and stopping the drive to said unpacking mechanism, a detector associated with the container conveyor, a spring urging said detector to contact each successive filled container whenever it is correctly located in the unpacking zone, a connection between said detector and said controller, a stop component co-operating with said detector, and a driving connection between said stop and the drive to said unpacking mechanism, the arrangement being such that if there should be no container correctly located in the unpacking zone for the unpacking operation the spring forces the detector to cause said controller to stop the last-mentioned drive and thus prevent the start of said operation.

6. An unpacking machine comprising a container conveyor for conveying article-filled containers to, and removing emptied containers from a lower-level position in an unpacking zone, which extends vertically upwards from said position, article-unpacking mechanism operating in the unpacking zone for unpacking from successive containers there groups of the articles, means for lowering and raising said mechanism vertically to and from said lower-level position, means associated with the container conveyor for aligning the incoming filled containers and guiding them to the unpacking zone, a device positionally related to mechanism for engaging each successive filled container temporarily to hold it correctly located in said lower-level position for engagement of the articles by said mechanism during the unpacking operation, an article-receiver for the articles in successive groups at the unpacking zone, means constraining said article-receiver to transverse movement at an upper level between a receiving position in the unpacking zone vertically above said lower-level position and a laterally offset position, an article conveyor extending longitudinally through said laterally offset position for conveying articles in succession from the article-receiver, an article-transferrer included in the article-receiver to transfer each successive group of articles therefrom to the article conveyor, and mechanism for moving the article-transferrer in one direction at said upper level from said laterally offset position to said receiving position in the unpacking zone for reception there of the unpacked articles and for advancing in the opposite direction at the same upper level the article-transferrer step-by-step a number of times to transfer each successive group of articles as a longitudinal row in single file to the article conveyor.

7. An unpacking machine according to claim 6 in which the container conveyor is arranged in two components, one of which components extends near to the unpacking zone and serves to convey towards said zone the incoming filled containers delivered to the machine and the other of which components across and beyond said zone, serving after the unpacking operation there to convey outgoing emptied containers delivered by the machine, the two conveyor components being arranged to convey at different levels so that there is a step between them to facilitate correct co-operation between the filled containers in succession and said engaging device.

8. An unpacking machine according to claim 7 in which the second of said components is arranged at a higher level to provide an up-step and in which said up-step is located at the incoming side of the unpacking zone to up-tilt each incoming case prior to engagement by the engaging device.

9. An unpacking machine according to claim 6 in which the container conveyor is arranged in two components, one of which components extends across the unpacking zone and serves to convey thereinto for the unpacking operation the incoming filled containers delivered to the machine and the other of which components extends from said zone and serves to convey outgoing emptied containers delivered by the machine, the two conveyor components being arranged to convey at different levels so that there is a step between them to facilitate correct co-operation between the filled containers in succession and said engaging device.

10. An unpacking machine according to claim 9 in which the second of said components is arranged at a lower level to provide a down-step and in which said down-step is located at the outgoing side of the unpacking zone to down-tilt each outgoing case after disengagement from the engaging device.

References Cited in the file of this patent

UNITED STATES PATENTS

| | | |
|---|---|---|
| 2,119,725 | Stecher | June 7, 1938 |
| 2,277,688 | Cattonar et al. | Mar. 31, 1942 |
| 2,358,447 | Creamer | Sept. 19, 1944 |
| 2,400,542 | Davis | May 21, 1946 |
| 2,403,673 | Mead | July 9, 1946 |
| 2,609,109 | Ardell | Sept. 2, 1952 |
| 2,621,774 | Rourke | Dec. 16, 1952 |
| 2,656,060 | Fischer et al. | Oct. 20, 1953 |